United States Patent [19]

Matthias

[11] Patent Number: 5,309,711
[45] Date of Patent: May 10, 1994

[54] CASCADE TYPE THRUST REVERSER FOR FAN JET ENGINES

[75] Inventor: Gregory H. Matthias, Chula Vista, Calif.

[73] Assignee: Rohr, Inc., Chula Vista, Calif.

[21] Appl. No.: 749,329

[22] Filed: Aug. 21, 1991

[51] Int. Cl.$^5$ ................................. F02K 3/02
[52] U.S. Cl. ..................... 60/226.2; 244/110 B; 239/265.29; 239/265.31
[58] Field of Search .................. 60/226.2; 244/110 B; 239/265.31, 265.29

[56] References Cited

U.S. PATENT DOCUMENTS

| | | | |
|---|---|---|---|
| 3,262,268 | 7/1966 | Beavers | 60/226.2 |
| 4,145,877 | 3/1979 | Montgomery | 60/226.2 |
| 4,216,926 | 8/1980 | Lawson | 244/110 B |
| 4,807,434 | 2/1989 | Jurich | 60/226.2 |

Primary Examiner—Richard A. Bertsch
Assistant Examiner—W. J. Wicker
Attorney, Agent, or Firm—P. J. Schlesinger; Frank D. Gilliam

[57] ABSTRACT

A cascade type fan jet engine thrust reverser system. A radially arranged opening is provided along the aft edge the of fan cowl of a fan jet engine. Cascade sets each including a plurality of turning vanes are fixedly positioned in each opening. A blocking door and an actuating linkage system are positioned flush with the inner wall of the fan cowl adjacent to the openings, with the linkage system substantially out of the air flow path during normal engine operation. A sleeve like member covers the outer surface of the cascade sets and at least partially covers the stowed linkage system. When reverse thrust is desired, the sleeve is caused to translate aft, uncovering the cascade set and linkage. The linkage system is caused to move the blocking doors to positions where air flow through the fan cowl is substantially blocked and diverted out through the cascade sets in an outward and reverse direction. Upon completion of thrust reversal operation, these components are returned to the stowed position.

9 Claims, 2 Drawing Sheets

CASCADE TYPE THRUST REVERSER FOR FAN JET ENGINES

BACKGROUND OF THE INVENTION

This invention relates in general to a cascade type thrust reverser for aircraft turbine engines and, more particularly, to a thrust reverser having blocker doors adapted to partially block fan flow and having cascade sets to reverse flow.

Modern aircraft fan jet engines have a fan cowl or shroud surrounding the fan portion of the engine and spaced outwardly from the core engine cowl to define an annular passage or duct for flow of fan air rearwardly from the outer portion of an enlarged axial flow fan. In this type of engine, a large proportion of the total thrust is developed by the reaction to the air driven rearwardly by the fan and the balance results from ejection of the exhaust gas stream from the engine.

Aircraft using gas turbine engines tend to have high landing speeds, placing great stress on wheel braking systems and requiring very long runways. To reduce this braking requirement and permit use of shorter runways, means are now provided in such engines for reversing a major portion of engine thrust during the landing roll. Many different types of thrust reversers have been designed, of varying effectiveness.

With fan-jet engines, it is possible to block and reverse substantially all of the fan flow without excessive stress on the system, since a large part of the core flow continues through the engine. In some cases, sufficient reverse flow can be obtained by blocking only a substantial portion of the fan flow.

One type of thrust reverser often used in non-fan type turbine engines, uses a pair of large sturdy clam-shell like blocker doors which swing directly behind the jet exit nozzle and diverge forwardly to reverse thrust. This system must be very heavy and strong. Very complex and sturdy actuators are required for this system.

Another design uses pivotable doors lying in opening in the sidewall of the shroud or fan cowl which pivot outwardly while a second set of doors pivot inwardly to block flow of air through the duct and direct it to the outwardly extending doors which direct air flow rearwardly. Typical of these is the system disclosed by Ellis in U.S. Pat. No. 3,612,401. These systems, while useful in fan-jet engines, tend to be heavy and mechanically complex.

Yet another design uses a plurality of pivotable doors located in openings arranged radially around the fan shroud. Each door pivots so that one inner end nearly contacts the engine cowl to block air flow through the annular duct while the other end extends outside the fan cowl in a direction to direct air forwardly. Typical of these the systems disclosed by Maison et al in U.S. Pat. No. 3,605,411 and Fournier et al in U.S. Pat. No. 4,485,970.

Still another type of thrust reverser uses cascade sets positioned in the sidewalls of the fan cowl with a translating system for uncovering the cascades to direct air flow through the guide vanes of the cascades, which turn the airflow in a forward direction. Typical cascade type reversers include those disclosed by Montgomery in U.S. Pat. No. 4,145,877 and Hom et al in U.S. Pat. No. 3,500,646. These systems are often mechanically simpler than others, since only a small internal blocker door set is needed and the cascade set can be rigidly secured to the fan cowl, thereby resulting in fewer separate moving parts. However, it is generally necessary that at least a portion of the actuating devices for uncovering the cascades and for moving the blocker doors extend into the air stream to the engine cowl during normal engine operation. This increases drag and is wasteful of fuel.

Thus, there is a continuing need for improved thrust reverser systems for fan-jet engines which are mechanically sturdy while being light in weight and avoiding added drag within the fan air flow.

SUMMARY OF THE INVENTION

An object of this invention is, therefore, to provide a thrust reverser system that overcomes the above-noted problems. Another object of this invention is to provide a sturdy, light-weight, simple thrust reverser system of the cascade type. A further object is to provide a cascade thrust reverser system in which the blocker door actuating assembly is contained within the fan cowl and is out of the engine fan airflow during normal engine operation.

The above noted objects, and others, are accomplished in accordance with this invention by a thrust reverser system comprising a plurality of thrust reverser sets arranged radially within a by-pass engine fan cowl, each set comprising an opening in the fan cowl wall, a cascade set having a plurality of turning guide vanes positioned within each opening, a blocker door assembly that lies substantially coextensive with the inner wall of the fan cowl during normal engine operation, a link-type actuator connected to each blocker door and lying substantially entirely outside the fan airflow during normal engine operation, said actuator adapted to move said blocker door to a position substantially blocking fan airflow and directing that flow through said cascade set, and a translatable sleeve forming part of the aft portion of said fan cowl and covering said cascade set during normal engine operation, said translatable sleeve adapted to being translated aft to uncover said cascade set and actuate the blocker doors to a deployed position during reverse thrust operation.

BRIEF DESCRIPTION OF THE DRAWING

Details of the invention, and of preferred embodiments thereof, will be further understood upon reference to the drawing, wherein.

DESCRIPTION OF PREFERRED EMBODIMENTS

Figure 1:
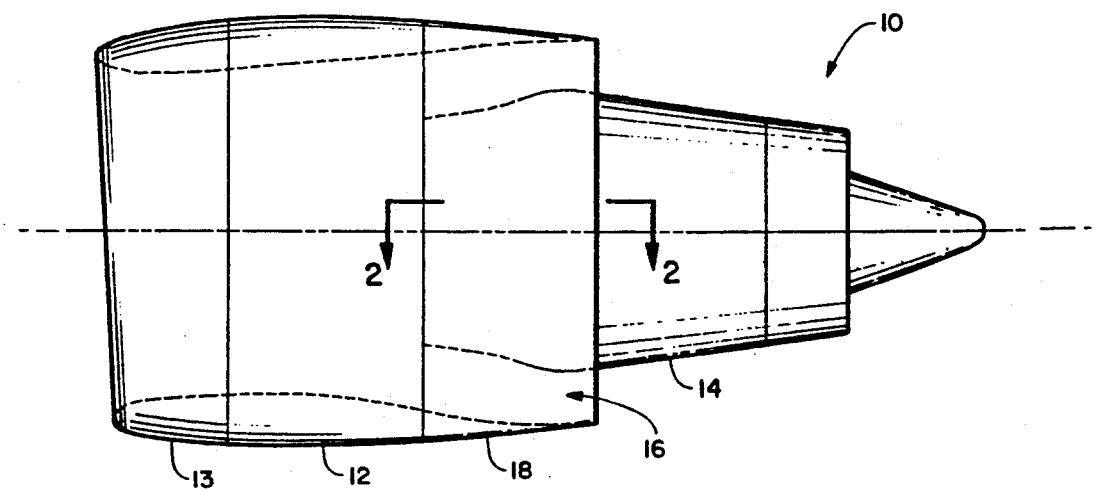
FIG. 1 is a schematic side view of a typical fan-jet engine nacelle system which incorporates the thrust reverser system of this invention.

Referring now to FIG. 1, there is seen a nacelle 10 for an aircraft engine of the fan-jet type including a fan cowl 12 having a core cowl 14 which extends within fan cowl 12 forming an annular duct 16 through which fan airflow passes in a conventional manner. The aft end of fan cowl 12 is provided with a translating sleeve 18 having outer and inner surfaces. Sleeve 18 can be translated aft to uncover the thrust reverser assembly, as is detailed in FIGS. 2-5.

Figure 2:
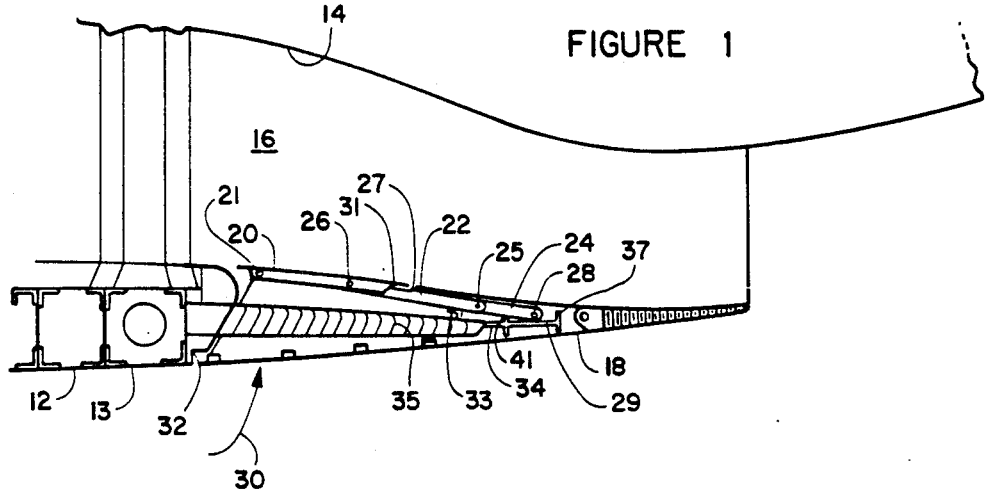
FIG. 2 is a schematic section view through the outer portion of the nacelle system with the thrust reverser in normal flight position, taken on line 2—2 in FIG. 1.

FIG. 2 shows a section view through the area of sleeve 18 in FIG. 1, with the section taken in a plane that includes the centerline of engine 10. The fan cowl includes a fan case or torque box 13. Sleeve 18 abuts fan cowl 12 and fan case 13 at its forward end in a streamlined manner. Core cowl 14 extends within fan cowl 12 and sleeve 18 to form duct 16. Blocker door 20 lies flush with the inner surface of sleeve 18 and is pivotally connected towards its leading edge by opposing pivots 21 that are connected to the translating sleeve 18. A two piece linkage made up of a first, short link 24 and a second, long link 22 connects each blocker door 20 to the fan cowl. The two links are hinged together at 25 and are hingedly fastened by pivot 26 to blocker door 20 at the forward end and to a pivot means 28 at the aft end. Pivot 26 includes a conventional torsion spring 29, as schematically indicated, to bias door 20 to a normally undeployed position as illustrated. Pivot 28 is positioned within a flanged bracket 29 that is fixed, as in the cascade set 30, to fan case 13. The links 22 and 24 are out of the airflow through duct 16 when in the normal engine operation position shown in FIGS. 1 and 2 and blocker door 20 forms a streamlined part of the inner wall of sleeve 18.

A cascade set 30 is positioned within translating sleeve 18 and is rigidly secured to the fan cowl structure 13 at both its forward end 32 and its aft end 34. Cascade set 30 includes a plurality of turning guide vanes 35 arranged to divert fan airflow from within duct 16 to an outward and forward direction relative to engine 10, as is detailed below. A plurality of cascade sets 30 are substantially uniformly spaced around fan cowl 13, with a narrow island structure between cascade sets to provide a strong connection between the forward and aft cascade supports, support for the linkage actuators and for a conventional mechanism, such as lead screws, for translating sleeve 18 in the aft direction.

When reverse thrust is desired, a conventional drive (not shown) such as electrical or hydraulic motors, which may operate through flexible drive cables, translates sleeve 18, uncovering cascade sets 30. Blocker door 20, being pivoted at pivot 21 and being secured through links 22 and 24 to fixed pivot 28, begins to move inwardly toward core cowl 14.

As seen in FIG. 2 with blocker door 20 and the associated links 22 and 24 form a smooth streamlined surface. First link 24 abuts flange 21 on bracket to prevent rotation of link 24 in the counter clockwise direction. A stop 27 on second link 22 engages a portion 31 of door 20 to maintain them in a substantially straight line with the conventional torsion spring 29 around pivot 26 further serving to bias links 20 and 22 toward the straight alignment.

Figure 3:
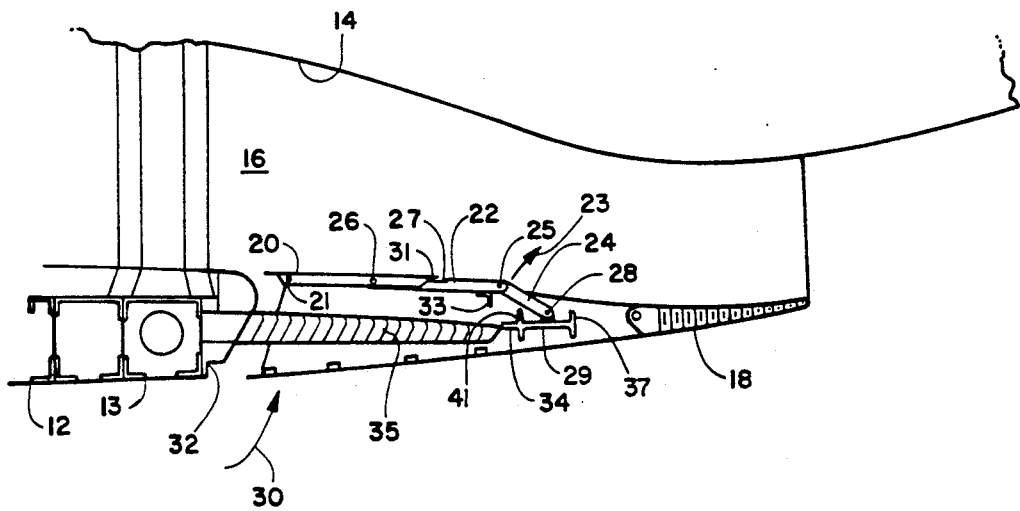
FIG. 3 is a schematic section view as in FIG. 2, but with initial deployment of the thrust reverser system having begun.

An early stage in the deployment of blocker door 20 is schematically shown in FIG. 3. Link 24 has begun to rotate in the direction indicated by arrow 23, with the assembly of door 20 and link 22 moving rearwardly. Link 24 moves out of engagement with flange 21. Link 24 is moving closer to stop 33 secured to link 22.

Figure 4:
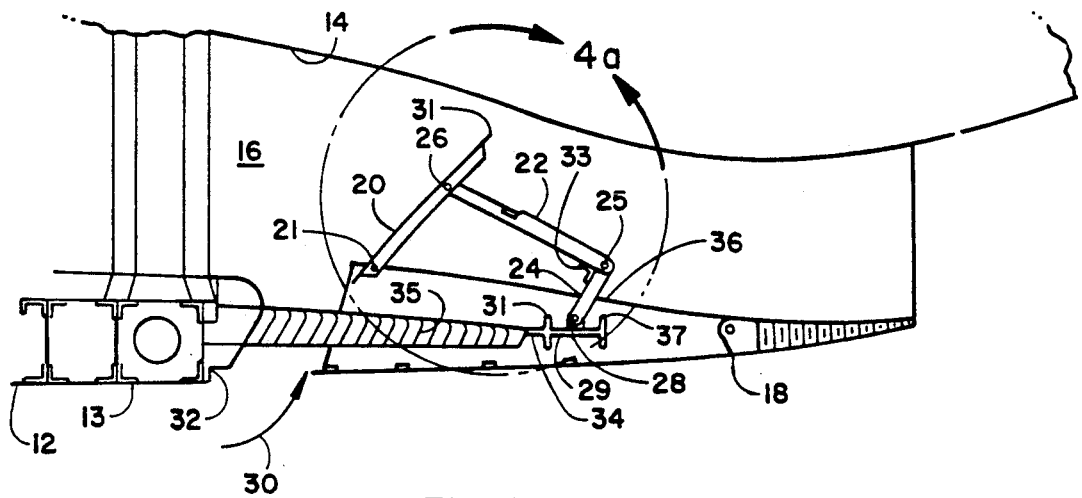
FIGS. 4 and 4a are a schematic section view as in FIG. 2, but with the thrust reverser system approximately half deployed.
Figure 5:
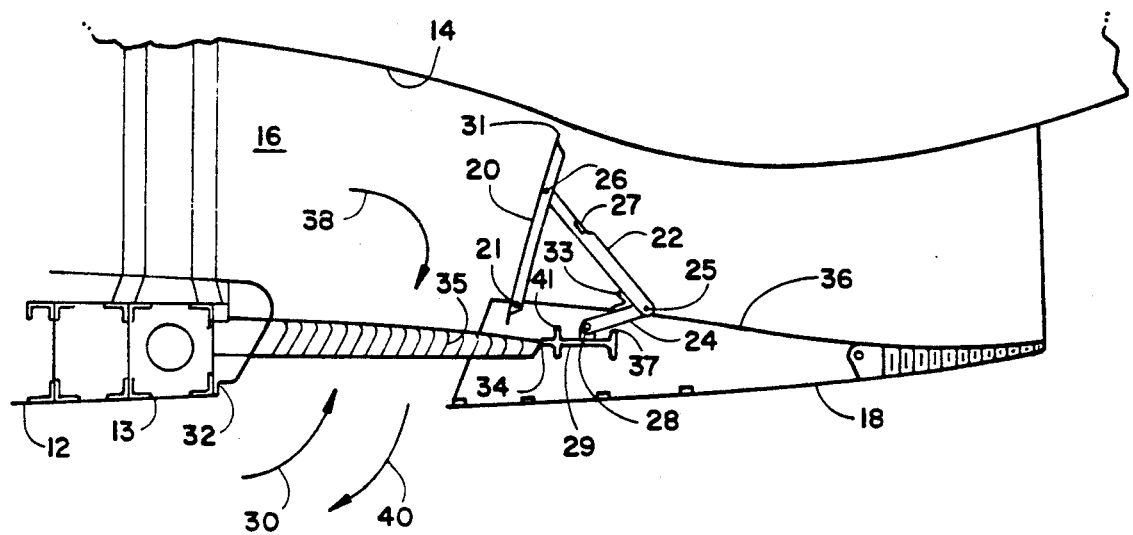
FIG. 5 is a schematic section view as in FIG. 2, but with the thrust reverser system fully deployed.
Figure 4A:
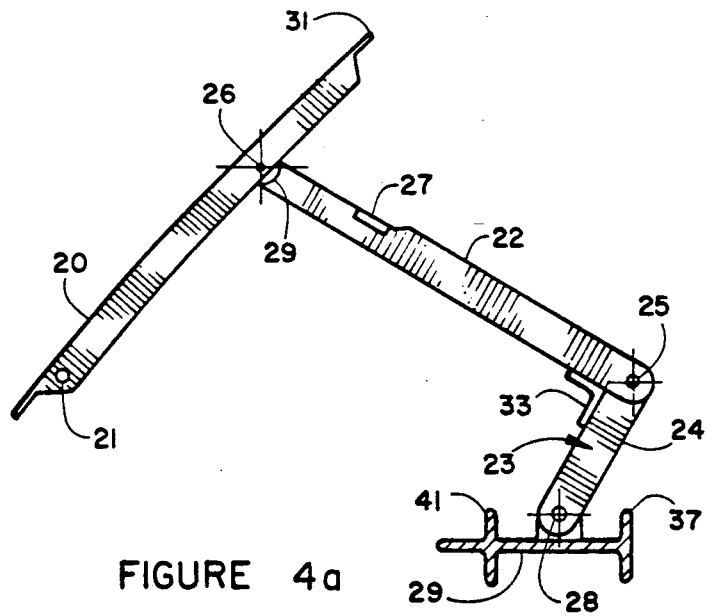

As seen in FIG. 4, when link 24 encounters stop 33, links 22 and 24 are in locking contact and rotate together. The position of stop 33 is adjustable, such as by bolts in slots, to vary the location of stop 33 along link 22. This causes the end of link 22 pivotable connected to door 20 to lift aft edge 31 of door 20 out of contact with stop 41 so that door 20 begins to limit air flow through duct 16 and direct that flow toward and through cascades 30. FIG. 4 shows the thrust reverser approximately half deployed. Sleeve 18 is reaching the fully aft position, so that the upper inner edge 36 does not interfere with the linkage. Edge 31 on blocker door 20 is approaching the surface of core cowl 14.

As blocker door 20 reaches full deployment, link 24 reaches and contacts flange 37 on bracket 29, thereby preventing further rotational movement of link 24. A selected amount of air flow is allowed to continue through the small space between core cowl 14 and edge 31 to cool core engine components. Each blocker door 20 is somewhat trapezoidal in plan, so that the edges of adjacent doors cooperate to substantially block a major portion of duct 16 when fully deployed. Links 20 and 22 are fully rotated and sleeve 18 has moved to the maximum aft position. Air flow direction is indicated by arrows 38 and 40.

The forward ends of the doors 20 would be secured to extensions on sleeve 18 so that rearward translation of sleeve 18 caries with it the forward door ends and generates the deployment sequence.

This is a simple, lightweight system which is fully effective in the thrust reversal mode and which does not interfere with air flow through duct 16 in normal engine flight operation. The system is returned to the stowed position simply by translating sleeve 18 forward to the stowed position and to pull the associated pivoted door 20 back to its original position.

Other applications, variations and ramifications of this invention will occur to those skilled in the art upon reading this disclosure. Those are intended to be included within the scope of this invention, as defined in the appended claims.

I claim:

1. A cascade type fan jet engine thrust reverser having an improved actuation system which comprises;

a fan jet engine cowl having a radially arranged opening adjacent to a fan case portion of the fan cowl, the fan case being disposed at the aft end of the fan cowl;

cascade sets having a plurality of turning vanes secured within said opening;

sleeve means substantially coextensive with the outer surface of said fan jet engine cowl and adapted to close said opening and cover said cascade sets during normal engine operation and adapted to being moved aft to uncover said cascade sets during reverse thrust operation;

a plurality of blocker doors lying substantially coextensive with the inner wall of said sleeve adjacent to said opening, each of said blocker doors having a forward edge and a pivot connection adjacent to said forward edge to said sleeve means for translating said pivot connection with the translation of said sleeve means; and a linkage assembly at the center of each blocker door connected between each blocker door and a pivot means secured to said fan case, through said cascade set, said linkage lying substantially entirely out of the path of air flow through said fan cowl during normal engine operation and adapted to cause said blocker door to simultaneously rotate as said sleeve means is moved aft rotating said blocker door into a position blocking air flow through said fan cowl and directing said airflow toward said cascade set during reverse thrust operation; and each of said linkage assemblies including two links, a short link connected to a pivot means on a bracket secured to said engine and a long link pivotably connected between the free end of the short link and said door whereby translation of said sleeve means causes said door to translate, the translation of said door being resisted by said links, to move said door toward the deployed position with translation of said sleeve means in the opposite direction moving the door back to the stowed position.

2. The thrust reverser according to claim 1 wherein said sleeve means further includes an inner portion that at least partially covers said linkage assemblies when said sleeve is in the stowed position and uncovers said linkages when said sleeve is in the deployed position.

3. The thrust reverser according to claim 1 wherein said linkage assembly includes a first flange on said bracket adapted to contact said short link when said assembly is moved to the stowed position and prevent movement of said short link beyond the stowed position and a stop and edge means on said long link that said door is adapted to engage as said assembly is moved to the stowed position and maintain said long link and door in a substantially straight stowed configuration.

4. The thrust reverser according to claim 3 further including a torsion spring coupled to the connection between said short and long links configured to bias said links toward said stowed configuration.

5. The thrust reverser according to claim 3 wherein said linkage assembly further includes a stop means on said long link adapted to contact said short link as said short and long links pivot during deployment to prevent further relative rotation of said links during further deployment and to cause said stop and edge means to separate allowing said door to rotate toward the deployed position relative to said long link and a second flange on said bracket adapted to contact said short link when said assembly is moved to the fully deployed position and prevent movement of said short link beyond the deployed position.

6. In a cascade type fan jet engine thrust reverser for a fan jet engine having a fan cowl having a fan case portion, a translating sleeve and an engine core cowl forming an air flow duct therebetween and having a plurality of radially arranged spaced opening adjacent to the aft end of said fan cowl, cascade sets, each having a plurality of turning vanes, secured within said opening, a blocker door having a stowed position lying substantially coextensive with the inner wall of said translating sleeve adjacent to said opening, sleeve means substantially coextensive with the outer surface of said fan cowl and adapted to cover said cascade sets during normal engine operation and adapted to being translated aft to uncover said cascade sets during reverse thrust operation and a linkage means for moving each of said blocker doors between the stowed position and a deployed position directing air flow through said the corresponding cascade set, the improvement wherein each of said blocker door and linkage assemblies comprises;

a fixed in position bracket mounted on fan case adjacent to the aft end of each cascade set;

a link assembly comprising, a first link having a first end pivotably mounted adjacent to said bracket and a second link pivotably connected to the second end of said first link;

said blocker door pivotably connected to the second end of said second link and to said translating sleeve;

said blocker door and first and second links forming a portion of the inner fan cowl wall in the stowed position;

translation of said translating sleeve pivots said first and second links and blocker doors to a deployed position in which said blocker doors block most air flow through said duct and directs that air flow through the cascade sets.

7. The improvement according to claim 7 wherein said linkage assembly includes a first flange on said bracket adapted to contact said first link when said assembly is moved to the stowed position and prevent movement of said first link beyond the stowed position and a stop and edge means on said second link and said door adapted to engage as said assembly is moved to the stowed position and maintain said second link and door in a substantially straight stowed configuration.

8. The improvement according to claim 7 further including a torsion spring coupled to the connection between said second link and said blocker doors configured to bias said links toward said stowed configuration.

9. The improvement according to claim 8 wherein said linkage assembly further includes a stop means on said second link adapted to contact said first link as said first and second links pivot during deployment to prevent further relative rotation of said links during further deployment and to cause said stop and edge means to separate allowing said door to rotate toward the deployed position relative to said second link and a second flange on said bracket adapted to contact said first link when said assembly is moved to the fully deployed position and prevent movement of said first link beyond the deployed position.

* * * * *